United States Patent
Maclaughlin et al.

(10) Patent No.: US 9,803,105 B2
(45) Date of Patent: Oct. 31, 2017

(54) PROTECTIVE COATING COMPOSITIONS FOR PHOTOCATALYTIC LAYERS ON SUBSTRATES

(71) Applicant: Bluescope Steel Limited, Melbourne, Victoria (AU)

(72) Inventors: Shane A. Maclaughlin, New South Wales (AU); Binbin Xi, New South Wales (AU); Evan J. Evans, New South Wales (AU); Edward M. Boge, New South Wales (AU)

(73) Assignee: Bluescope Steel Limited, Melbourne, Victoria (AU)

( * ) Notice: Subject to any disclaimer, the term of this patent is extended or adjusted under 35 U.S.C. 154(b) by 0 days.

(21) Appl. No.: 14/381,711

(22) PCT Filed: Feb. 28, 2013

(86) PCT No.: PCT/AU2013/000181
§ 371 (c)(1),
(2) Date: Aug. 28, 2014

(87) PCT Pub. No.: WO2013/126957
PCT Pub. Date: Sep. 6, 2013

(65) Prior Publication Data
US 2015/0024925 A1    Jan. 22, 2015

(30) Foreign Application Priority Data

Feb. 28, 2012  (AU) ................ 2012900763
Feb. 28, 2012  (AU) ................ 2012900764

(51) Int. Cl.
C09D 183/04    (2006.01)
C09D 1/00      (2006.01)
(Continued)

(52) U.S. Cl.
CPC ............ *C09D 183/04* (2013.01); *B01J 31/38* (2013.01); *B01J 33/00* (2013.01); *B01J 35/004* (2013.01);
(Continued)

(58) Field of Classification Search
CPC ........................ B01J 35/004; C09D 183/04
See application file for complete search history.

(56) References Cited

U.S. PATENT DOCUMENTS 4,478,876 A   10/1984 Chung
6,265,029 B1   7/2001 Lewis
(Continued)

FOREIGN PATENT DOCUMENTS

EP    0987317      3/2000
EP    1101803 A1   5/2001
(Continued)

OTHER PUBLICATIONS

Product data sheet for Avery Dennison T-7000, "Avery Dennison® T-7000 & W-7000 MVP Series," published Mar. 2014, retrieved online from http://reflectives.averydennison.com/content/dam/averydennison/reflectives/na/UK/Product-Data-Sheets/T-7000%20-%20WW%20-%20ENG%20-%2003-2014.pdf on Oct. 27, 2015.*
(Continued)

*Primary Examiner* — Melvin C Mayes
*Assistant Examiner* — Stefanie Cohen
(74) *Attorney, Agent, or Firm* — Michael Best & Friedrich LLP

(57) ABSTRACT

A coated substrate including a substrate including a treated layer, a photocatalytic layer, and a protective layer for impeding photocatalyst derived degradation of the treated layer, the protective layer being provided between the photocatalytic layer and the treated layer, the protective layer
(Continued)

comprising colloidal particles distributed in a matrix comprised at least partly of an organosilicon phase which is oxidizable by the reactive oxygen species to form a non-volatile inorganic phase, wherein the organosilicon phase includes a surfactant incorporating an organosilicon component.

14 Claims, 2 Drawing Sheets

(51) Int. Cl.
  B01J 33/00   (2006.01)
  B01J 35/00   (2006.01)
  B01J 37/00   (2006.01)
  B01J 31/38   (2006.01)
  B05D 5/00    (2006.01)
  B08B 17/06   (2006.01)
  B05D 3/12    (2006.01)
  B05D 7/00    (2006.01)

(52) U.S. Cl.
  CPC ......... *B01J 35/006* (2013.01); *B01J 35/0013* (2013.01); *B01J 37/0018* (2013.01); *B05D 3/12* (2013.01); *B05D 5/00* (2013.01); *B08B 17/065* (2013.01); *C09D 1/00* (2013.01); *B01J 2231/70* (2013.01); *B05D 7/52* (2013.01); *B05D 7/56* (2013.01); *Y10T 428/25* (2015.01); *Y10T 428/259* (2015.01); *Y10T 428/265* (2015.01); *Y10T 428/31663* (2015.04)

(56) References Cited

U.S. PATENT DOCUMENTS

| | | | |
|---|---|---|---|
| 6,921,578 B2* | 7/2005 | Tsujino | C03C 1/008 106/287.34 |
| 7,354,650 B2 | 4/2008 | Nakajima et al. | |
| 7,736,735 B2 | 6/2010 | Kanamori et al. | |
| 2003/0059549 A1 | 3/2003 | Morrow et al. | |
| 2005/0186436 A1* | 8/2005 | Kohler | C08K 5/5455 428/447 |
| 2005/0233135 A1* | 10/2005 | Iyer | C03C 17/007 428/331 |
| 2007/0060693 A1 | 3/2007 | Ho | |
| 2007/0151482 A1 | 7/2007 | Im et al. | |
| 2009/0004482 A1* | 1/2009 | Sharma | C01B 33/1485 428/429 |
| 2010/0021648 A1 | 1/2010 | Ota | |
| 2011/0058142 A1* | 3/2011 | Berit-Debat | G02B 1/105 351/159.57 |

FOREIGN PATENT DOCUMENTS

| | | |
|---|---|---|
| EP | 1785457 | 5/2007 |
| JP | 2004-204091 A | 7/2004 |
| JP | 2004237639 | 8/2004 |
| JP | 2006008902 | 1/2006 |
| JP | 2011111558 | 6/2011 |
| JP | 2011161400 | 8/2011 |

OTHER PUBLICATIONS

Product data sheet for Nissan Chemical Organosilicasol, May 2008, retrieved from https://web.archive.org/web/20080513155257/http://www.nissanchem-usa.com/organosilicasol.php on Oct. 27, 2015.*

International Search Report for PCT/AU2013/000181 dated Apr. 5, 2013 (5 pages).

International Preliminary Report on Patentability for PCT/AU2013/000181 dated Jan. 9, 2014 (5 pages).

Product Guide L-G 1 Pain Additives (Feb. 2009), retrieved on Mar. 8, 2013 from http://pcimag.com/ext/resources/PCI/Home/Files/PDFs/Virtual_Supplier_Brochures/BYK_Additives.pdf (15 pages).

English Translation of Chinese Office Action for Application No. 201380011483.9 dated Dec. 16, 2015 (10 pages).

English Translation of Chinese Patent Office Action for Application No. 201380011483.9 dated Oct. 26, 2016 (9 pages).

* cited by examiner

PROTECTIVE COATING COMPOSITIONS FOR PHOTOCATALYTIC LAYERS ON SUBSTRATES

BACKGROUND OF THE INVENTION

The present disclosure relates to protective coatings for substrates. In particular, the present disclosure relates to protective coatings for use in self-cleaning systems.

Coated surfaces, such as painted surfaces, often accumulate dirt and dust with time, particularly when exposed to the environment. This is a particular issue for such architectural building products as painted steel sheet which is, for example, used in roof and wall cladding. As a result, these surfaces have to be periodically cleaned to maintain their appearance. The cleaning process is typically costly, time consuming and sometimes difficult, particularly when these surfaces are hard to access. A significant amount of this dirt and dust is comprised of organic material.

In this regard, there is a need to reduce organic material accumulation on the coated surface to avoid the need to manually clean the coated surfaces regularly.

One solution is to include a substance in the coating that can degrade the organic material. One method of degrading organic material is to incorporate a photocatalytic layer in a coating surface. Under the action of light, the photocatalytic layer produces reactive oxygen species, such as hydroxyl and superoxide ions, that react with and destroy organic material. However, these ions can also attack the underlying substrate, if it includes an organic composition (such as a paint layer), and can therefore adversely affect the durability and longevity of the coating.

Accordingly, there is a need for a means to impede diffusion of these reactive oxygen species.

The above references to the background art do not constitute an admission that the art forms a part of the common general knowledge of a person of ordinary skill in the art. The above references are also not intended to limit the application of the apparatus and method as disclosed herein.

SUMMARY OF THE INVENTION

In a first aspect, there is provided a coated substrate including:
- a substrate including a treated layer,
- a photocatalytic layer, and
- a protective layer for impeding photocatalyst derived degradation of the treated layer, the protective layer being provided between the photocatalytic layer and the treated layer, the protective layer comprising colloidal particles distributed in a matrix comprised at least partly of an organosilicon phase which is oxidisable by the reactive oxygen species to form a non-volatile inorganic phase, wherein the organosilicon phase includes a surfactant incorporating an organosilicon component.

Colloidal particles can provide an effective physical barrier to diffusion of reactive oxygen species by virtue of their typical relatively evenly distributed size and shape which enables their assembly into a more or less regular lattice arrangement. Accordingly, adjacent particles within the lattice arrangement can touch and bond to each other. However, the interstitial volume between the colloidal particles potentially provides a pathway for chemical diffusion of reactive oxygen species. By at least partially filling that volume with a matrix including an organosilicon phase, which is oxidisable by the reactive oxygen species to form a non-volatile inorganic phase, the density of the matrix is increased and diffusion of the reactive oxygen species can be minimised or inhibited. The combination of the colloidal particles and the matrix, comprising an organosilicon phase or its oxidation products, together can provide an effective barrier layer.

The inventors have recognised that the provision of a separate protective layer between the substrate and the photocatalytic layer (as opposed to a combined protective/photocatalytic layer) provides greater protection to the substrate from reactive oxygen species. A combined protective/photocatalytic layer may not offer much protection unless specifically designed for that function.

It has been found that optimum results are obtained where the organosilicon phase comprises a surfactant incorporating an organosilicon component, either by itself or in combination with a free silane, an organic-inorganic polymer hybrid or a silicone microemulsion. In an embodiment, the organosilicon phase comprises a surfactant by itself. Without wishing to be limited by theory, it is believed that the use of a surfactant as the organosilicon phase (as opposed to eg a resin) ensures sufficient wetting of the colloidal particles and therefore optimal bonding together of the particles in the protective layer. It has been found that the inclusion of a surfactant in the coating composition also facilitates application of the coating composition, such as by roll coating. The use of a silicon based surfactant as opposed to a carbon based one also enhances the bond strength between the colloidal particles and the organosilicon matrix.

In a second aspect, there is disclosed a coating composition for forming a protective coating on a substrate, the composition comprising colloidal particles in a medium including an organosilicon phase which is oxidisable by reactive oxygen species to form an inorganic silicate phase wherein the organosilicon phase includes a surfactant incorporating an organosilicon component.

Accordingly, the oxidisable organosilicon phase comprises a surfactant incorporating an organosilicon component which is oxidisable by the reactive oxygen species to form an inorganic silicate phase. The coating composition may further include additional organosilicon phases, such as a free silane, an organic-inorganic polymer hybrid, a sol-gel or a silicone microemulsion, an organosilicon compound coated onto individual silica colloid particles, or combinations thereof. The inorganic silicate phase may be a network silicate.

It has been found that better results are obtained using an organosilicon phase comprising a surfactant incorporating an organosilicon component, either by itself or in combination with a free silane, an organic-inorganic polymer hybrid or a silicone microemulsion. Preferably, the organosilicon phase comprises a surfactant by itself.

In a third aspect, there is disclosed a coating composition for forming a protective coating on a substrate, the composition comprising colloidal particles in a medium including a surfactant incorporating an organosilicon component, the colloidal particles including an outer layer of at least one organosilicon phase which is oxidisable by reactive oxygen species to form an inorganic silicate phase.

In an embodiment, the surfactant incorporating an organosilicon component is one of the family of ethoxylated heptamethyltrisiloxane surfactants or polyalkyleneoxide modified heptamethyltrisiloxanes such as 2-methoxy(oligoethyleneoxy)propyl]heptamethyl-trisiloxane In an embodiment, the organosilicon phase comprising the outer layer on the colloidal particles includes a functionalized alkylsubstituted alkoxysilane $Si(R^1)_x(OR^2)_{4-x}$ where: x=1-3

$R^1$ is an organic functional group of the type commonly found in alkoxy silanes including an alkyl or aryl group, a halogen, an epoxide, an isocyanate, a hydroxide, a quaternary ammonium cation, an amine, a carboxylic acid or carboxylic acid derivative, a ketone or aldehyde, a hydroxide, an ether, etc.

$R^2$ is an alkyl group $C_nH_{2n+1}$ where n=1-5.

In an embodiment, the alkylsubstituted alkoxysilane is trimethylmethoxysilane, trimethylethoxysilane, phenyltrimethoxysilane, diphenyldimethoxysilane, n-propyltrimethoxysilane, isobutyltrimethoxysilane, n-decyltrimethoxysilane, n-hexyltrimethoxysilane, 1,6-bis(trimethoxysilyl)hexane, γ-ureidopropyltrimethoxysilane, γ-dibutylam inopropyltrimethoxysilane, nonafluorobutyltrimethoxysilane, γ-glycidoxypropyltrimethoxysilane, γ-glycidoxypropylmethyldimethoxysilane, γ-(2-aminoethyl) aminopropyltrimethoxysilane, γ-(2-aminoethyl) aminopropylmethyl-dimethoxysilane, γ-methacryloyloxypropyltrimethoxysilane, γ-mercaptopropyltrimethoxysilane, γ-chloropropyltrimethoxysilane, γ-anilinopropyltrimethoxysilane, methyltrimethoxysilane, methyltriethoxysilane, vinyltrimethoxysilane, dimethyldimethoxysilane, octadecyldimethyl-[3-(trimethoxysilyl)propyl]ammonium chloride, N-trimethoxysilylpropyl-N,N,N-trimethylammonium chloride, N-(trimethoxysilylpropyl)isothiouronium chloride, Aminophenyltrimethoxysilane, N-(trimethoxysilylethyl)benzyl-N,N,N-trimethylammonium chloride, N.N-didecy-N-methyl-N-(3-trimethoxysilylpropyl)ammonium chloride, (2-triethoxysilylpropoxy)ethoxysulfolane, N-(trimethoxysilylpropyl)ethylenediaminetrisodium triacetate, 2-[methoxy (polyethyleneoxy) propyl]triemethoxysilane, Bis(3-trimethoxysilylpropyl) amine, Tetradecyldimethyl(3-trimethoxysilylpropyl)ammonium chloride and N-(3-triethoxysilylpropyl)gluconamide.

In an embodiment, the alkylsubstituted alkoxysilane comprises from 0.1% to 100% by weight of the colloid particles.

In an embodiment, the effect of the protective layer on the colour and gloss of the substrate is not more than 20 delta E units, such as less than 10 delta E units, for example less than 5 delta E units. The gloss difference between the coated substrate and an uncoated substrate may not be more than 20%. Preferably, the gloss difference is not more than 10%, more preferably not more than 5%.

In an embodiment, the thickness of the protective layer is from 25 to 1000 nm. Preferably, the thickness of the protective layer is from 50 to 600 nm. More preferably, the thickness is from 60 to 400 nm. The optimum thickness will depend on the composition of the layer and the roughness of the underlying substrate. However, it has been found that where the coating thickness exceeds approximately 1000 nm, the mechanical stability of the coating begins to decline and the coating is prone to cracking.

The colloidal particles preferably comprise one or more oxides.

In an embodiment, the colloidal particles are selected from one or more oxides of metallic and/or non-metallic elements such as silicon, aluminium, boron, titanium, zirconium and phosphorous.

The colloidal particles may have a particle size in the range from 0.4 to 400 nm. In an embodiment, the colloidal particles have a particle size in the range from 5 to 50 nm. The colloidal particles may have a particle size greater than 8 nm, preferably greater than 10 nm, such as from 10 to 40 nm. Colloids having such particle size ranges are more commercially available than smaller particles sizes, and thereby facilitate processing. Also, where the colloidal particles are smaller than this size, the resulting smaller interstitial spaces provide less flexibility with respect to material selection for filling those spaces. In another embodiment, the colloidal particles have a particle size in the range from 8 to 20 nm.

Preferably, the colloidal particles have a narrow particle size distribution. The particle size distribution may have a standard deviation of less than 20% of the average particle size. Preferably, the standard deviation is less than 10%, such as less than 5%. In an embodiment, the standard deviation is less than 2%.

The colloidal particles may comprise the LUDOX® family of nanoparticulate silica colloids. The particle size of the LUDOX® colloids may vary from around 8 nm up to 22 nm, such as from 10 to 22 nm.

In an embodiment, the colloidal particles are composed of particles having at least two different particle size distributions. The colloidal particles may include at least first and second types of particles. The first type of particles may have an average particle size between 0.4 and 50 nm and the second type may have an average particle size between 5 and 200 nm. The at least first and second types of particles may be as described in applicant's co-pending application No AU 2012900764 titled "Coating II" the entire disclosure of which is incorporated herein by reference.

The colloidal particles are typically suspended or dispersed in an aqueous or organic medium.

The choice of aqueous or organic medium will be largely dependent on the surface characteristics of the colloidal particles. In general, uncoated colloidal particles are suspended in an aqueous medium, whereas colloidal particles coated with an organosilicon phase are suspended in an organic medium.

In the case of an aqueous medium, the colloidal particles may be stabilised in alkaline solution before or during incorporation into the coating composition. The colloidal particles may be associated with soluble cations including, but not limited to, lithium, sodium, potassium, ammonium, and alkyl ammonium ions.

The particles may also be stabilised in organic solvents such as, and not limited by, alcohols of the general formula $HOC_nH_{2n+1}$, where n=1 to 8, aromatic hydrocarbons, aliphatic hydrocarbons, ketones, ethers or halogen compounds such as chloroform and methylene chloride.

The concentration of colloidal particles in the coating solution may range from 0.1-30 wt %. The concentration is preferably less than 20 wt %, such as from 1 to 2 wt %. In an embodiment, the concentration of colloidal particles in the coating solution range from 0.1-10 wt %.

The coated substrate may also include a photocatalyst capable of generating reactive oxygen species. The photocatalyst is present in a separate, photocatalytic layer. The photocatalyst interacts with electromagnetic radiation and water to produce reactive oxygen species such as hydroxyl and superoxide ions that act as an oxidant to degrade organic material and prevent their accumulation on the coating surface.

The substrate may be a metal substrate. In an embodiment, the substrate includes a treated surface. The treated surface may be a coloured surface, such as a painted surface. Alternatively, the treated surface may include a polymeric coating, such as on a solar cell.

The protective layer may be a barrier layer provided between the treated surface and a photocatalytic layer.

In an embodiment, a photocatalyst is provided in a separate photocatalytic layer, wherein the protective layer is located between the substrate and the photocatalytic layer. The photocatalyst layer may also include other colloidal particles, such as colloidal silica particles. The concentration of photocatalytic particles in the photocatalytic layer may range from 0.1 to 100%, depending on the activity of the photocatalyst (with the concentration of the photocatalyst being inversely proportional to its catalytic activity). The concentration may range from 0.1 to 10%, such as from 1 to 5%.

The photocatalyst may be dispersed in a solvent in a concentration range from 0.01 to 30%, such as from 0.1 to 10 wt % before application onto the protective layer. Preferably, the concentration range is from 1 to 3 wt %. The solvent may be aqueous or organic-based.

The photocatalytic particles may be comprised of a metal oxide such as, but not limited to, one of nanoparticulate titanium dioxide or derivatives of titanium dioxide such as titanium dioxide doped with metal cations such as iron, vanadium, and other transition or rare earth metals, nanoparticulate zinc oxide, nanoparticulate tin oxide, or nanoparticulate cerium oxide. The nanoparticulate titanium dioxide may be the commercially available Degussa P25 photocatalyst.

Advantageously, when photocatalytic particles in the form of titanium dioxide are used with silica colloidal particles, hydrophilicity of the coating surface is enhanced to improve the self-cleaning properties of the coating.

In an embodiment, the matrix comprises from 0.1% to 100% by weight of the colloid particles.

In a fourth aspect, there is disclosed a coated substrate including a layer comprising colloidal particles distributed in a matrix comprised at least partly of one or more inorganic silicates formed by the oxidation of at least one organosilicon phase by reactive oxygen species, wherein the organosilicon phase includes a surfactant incorporating an organosilicon component.

In a fifth aspect of the invention, there is disclosed a photocatalytic, self-cleaning coated substrate comprising:
 a substrate including a treated surface;
 a barrier layer on the treated surface, the barrier layer comprising colloidal particles distributed in a matrix comprised at least partly of one or more organosilicon phases which are oxidisable by reactive oxygen species to form one or more inorganic silicate phases, and/or one or more inorganic silicates formed by the oxidation of at least one organosilicon phase by reactive oxygen species, wherein at least one said organosilicon phase is a surfactant incorporating an organosilicon component; and
 a photocatalytic layer on the barrier layer.

In a sixth aspect, there is disclosed a method for protecting a substrate from degradation by reactive oxygen species, the method including the steps of:
 providing a substrate including a treated surface;
 applying on the treated surface a coating of a composition comprising colloidal particles dispersed in a medium including at least one organosilicon phase which is oxidisable by reactive oxygen species to form an inorganic silicate phase at least one said organosilicon phase including a surfactant incorporating an organosilicon component;
 converting the coating to form a protective layer.

The protective coating composition may be applied by roll coating. The roll coating is preferably conducted in a continuous process. After the coating composition is applied, it is dried at a temperature sufficient to remove excess solvent, such as in the range of 50 to 150° C.

It has been found that the inclusion of a surfactant in the coating composition facilitates application of the coating composition by roll coating. The surfactant enhances wettability of the surface being coated and avoids the need for specialised surface treatment prior to application, such as by corona discharge treatment. Roll coating also enables the coating composition to be applied in a relatively thin layer as compared to other application techniques, such as spraying.

In a seventh aspect, there is disclosed a photocatalytic self-cleaning coated building product comprising:
 a metal substrate;
 a paint layer on the metal substrate;
 a barrier layer on the paint layer, the barrier layer comprising colloidal particles dispersed in a matrix comprised at least partly of:
  one or more organosilicon phases which are oxidisable by reactive oxygen species to form one or more inorganic silicate phases, and/or
  one or more inorganic silicates formed by the oxidation of at least one organosilicon phase by reactive oxygen species;
 and
 a photocatalytic layer on the barrier layer;
 wherein the at least one organosilicon phase includes a surfactant incorporating an organosilicon component.

BRIEF DESCRIPTION OF DRAWINGS

Preferred embodiments of the present invention are hereinafter described by way of example only, with reference to the accompanying drawings, wherein.

DETAILED DESCRIPTION

Figure 1:
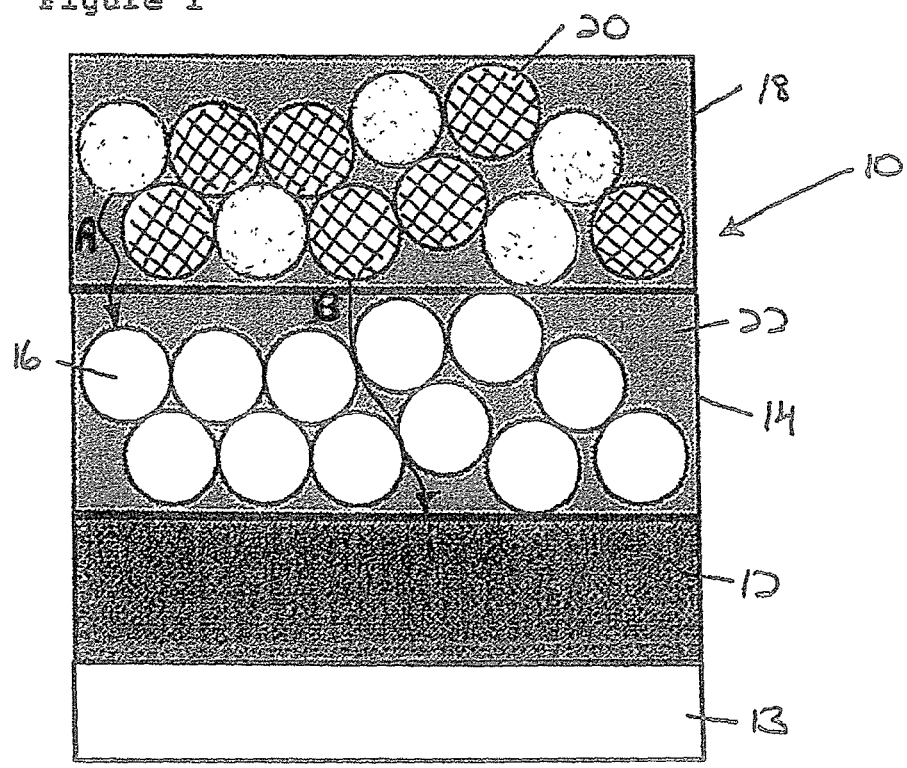
FIG. 1 is a cross-sectional schematic view of a first embodiment of a coated substrate with a separate photocatalytic layer.
Figure 2A:
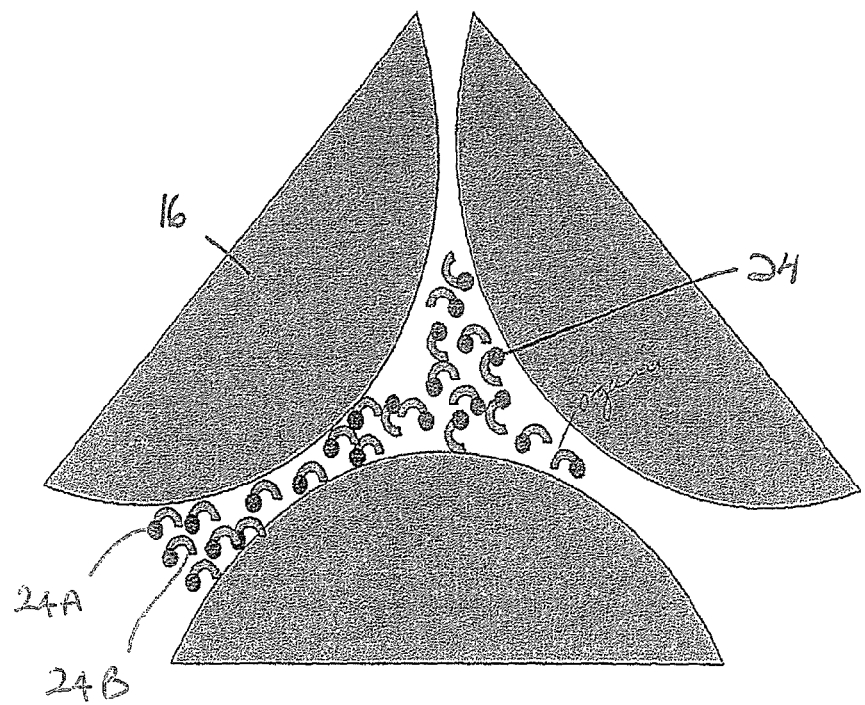
FIGS. 2A and 2B are schematic magnified views of silica network formation from reaction between reactive oxygen species and organo-silicon-containing surfactant.
Figure 2B:
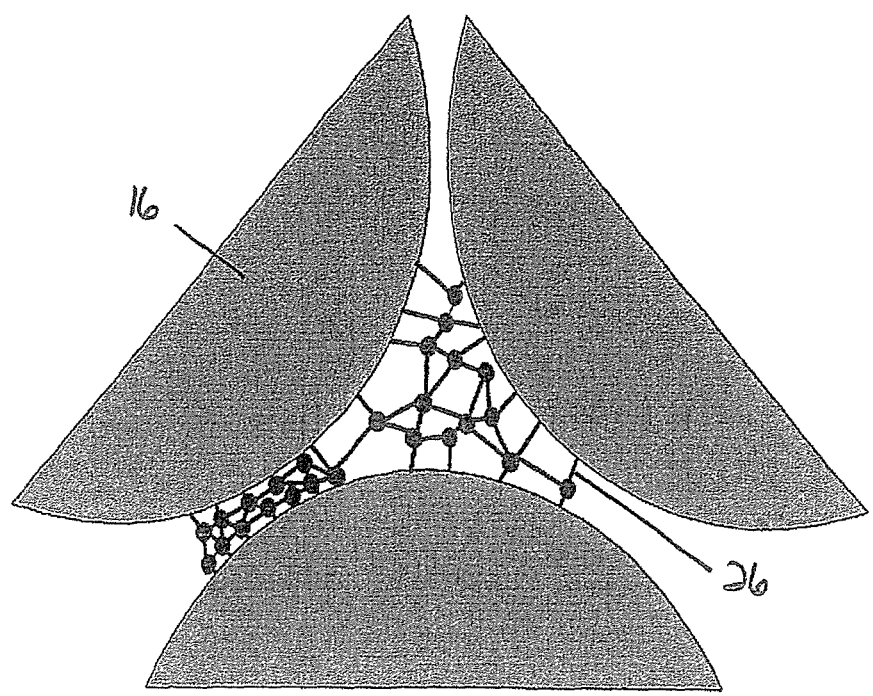

One form of a coated substrate generally denoted as 10 is illustrated in FIGS. 1, 2A and 2B. In this form, the oxidisable phase is in the form of a surfactant dispersed matrix.

The coated substrate 10 includes paint layer 12 disposed on metal substrate 13, a protective layer 14 on the paint layer 12 and a photocatalytic layer 18 on the protective layer. The protective layer 14 comprises colloidal particles 16 of one or more oxides distributed in a matrix 22. The matrix 22 is comprised of an oxidisable phase which is oxidisable by reactive oxygen species to form a non-volatile inorganic phase. The photocatalytic layer 18 includes photocatalytic particles 20 comprising of a metal oxide such as, but not limited to, one of nanoparticulate titanium dioxide or derivatives of titanium dioxide such as titanium dioxide doped with metal cations such as iron, vanadium, and other transition or rare earth metals, nanoparticulate zinc oxide, nanoparticulate tin oxide, or nanoparticulate cerium oxide (see FIG. 1).

The colloidal particle size ranges from 10 to 40 nm and may be derived from oxides of silicon, aluminium, boron, titanium, zirconium and phosphorous. The colloidal particles may also be derived from oxides of other single elements or a mixture of metallic and/or non-metallic elements.

If necessary, the colloidal particles may be first stabilised in an alkaline solution before forming the coating composition. The concentration of colloidal particles in the coating composition ranges from 0.1 to 10 wt %. The colloidal particles may associate with soluble cations including lithium, sodium, potassium, ammonium and alkyl ammonium ions.

The protective layer 14 is formed by application of the coating composition onto the paint layer 12. The coating composition comprises a suspension of colloidal particles 16 in an aqueous or organic solvent in which organosilane-based surfactants 24, comprising silicon-based portion 24A and organic portion 24B, are also added (see FIG. 2A).

The photocatalytic layer 18 includes photocatalytic particles 20 which are present in the layer at a concentration ranging from 0.1 to 100%, depending on the activity of the photocatalyst (with the concentration of the photocatalyst being inversely proportional to its catalytic activity). Before application onto protective layer 14, the photocatalyst particles are dispersed in a liquid medium at a concentration from 1 to 3 wt %. The medium can be aqueous or organic-based and includes alkaline solutions, alcohols of the general formula $HOC_nH_{2n+1}$, where n=1 to 8, aromatic hydrocarbons, aliphatic hydrocarbons, ketones, ethers or halogen compounds such as chloroform and methylene chloride.

Upon application of the coating composition onto paint layer 12, the particles adopt a lattice formation in which adjacent particles are able to contact each other within matrix 22 which acts as a barrier to chemical diffusion by reducing the space within protective layer 14 in which the reactive oxygen species may diffuse to the paint layer (see path A in FIG. 1). The surfactants are distributed throughout matrix 22 between the colloidal particles (see FIG. 2A). However, there will still be some capacity for chemical diffusion of the reactive species to paint layer 12 through the interstitial spaces between the particles within the matrix (see path B in FIG. 1).

When the photocatalyst particles 20 are activated by electromagnetic radiation such as ultraviolet and visible radiation, they produce reactive oxygen species such as hydroxyl and superoxide ions. The reactive oxygen species oxidise any organic material deposited onto the outer surface of the coating into carbon dioxide and water.

When these reactive oxygen species diffuse into the protective layer, they are impeded from reaching the underlying paint layer 12 by colloidal particles 16. However, diffusion through the matrix 22 may still be possible. In this regard, when these reactive oxygen species encounter surfactant 24 within the matrix, it is believed that the organic portion of the surfactant is oxidised to carbon dioxide and water while the silicon-based portion is converted to solid silica. A stable silica network 26 is thereby formed between the colloid particles, which impedes diffusion of these reactive species through the interstices between the particles (see FIG. 2B).

The surfactant also functions as a processing aid by decreasing foaming of the coating mixture during application of the coating on the substrate.

Advantageously, when titanium dioxide is used as the photocatalyst, it can be combined with silica to form a superhydrophilic surface. The easy wetting and water mobility properties of the surface provide enhanced self-cleaning benefits to the coating by increasing the ability of water on the coating surface to wash away any organic material.

Figure 3:
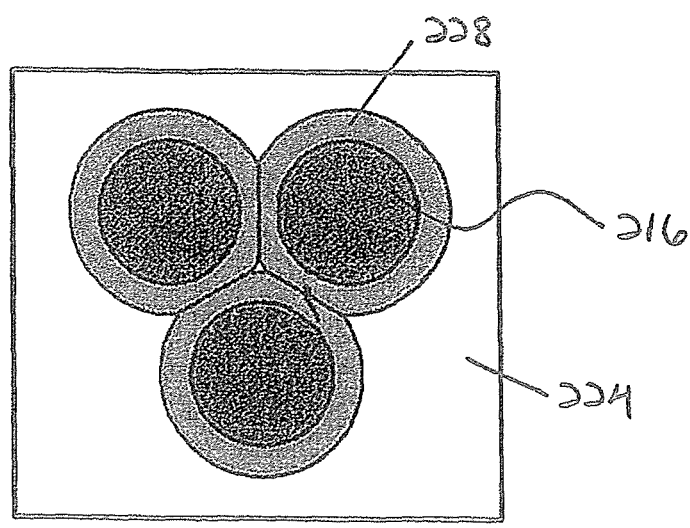
FIG. 3 is a cross-sectional schematic view of a second embodiment comprising coated colloidal particles.

FIG. 3 illustrates a further embodiment of a coated substrate in which, again, like reference numerals refer to like parts. In this form, colloidal particles 216 include an organosilicon layer 228, which is non-rigid and has a higher silicon content that the surrounding matrix including surfactant 224.

As a result of the fluidity of organosilicon layer 228, interpenetration of the organosilicon layers of adjacent particles fill a greater proportion of the interstitial volume between the particles. Accordingly, when the reactive oxygen species react with layer 228, the density of the silica network is increased compared to a matrix including rigid particles.

EXAMPLE

A panel, which had been coil coated with a melamine cured polyester paint, was treated with a protective coating composition formulated as follows. A LUDOX® HS-40 silica colloid suspension, having a nominal 12 nm particle size, was diluted with water to 2% w/w $SiO_2$ and 0.4% v/v of the surfactant 2-[methoxy-(oligoethyleneoxy)propyl] heptamethyltrisiloxane was added. The coating composition was applied to the paint panel using a number 10 drawdown bar. After drying, the calculated average protective coating thickness was 270 nm. This coated panel was then further treated with a 2% w/w solution of P25 titanium dioxide photocatalyst in water using a number 10 drawdown bar. After drying, the calculated average photocatalyst layer thickness was 270 nm. This provided a high concentration of active photocatalyst on the surface of the panel. The specifications of the coated panel are shown below in Table 1 as Sample 5.

A melamine cured polyester paint was used rather than a polyvinylidenefluoride paint because the effects of photocatalytically driven oxidation would be more readily apparent on this system than on polyvinylidenefluoride paint.

Comparison Samples 1 to 4 were prepared in a similar way according to the specifications given in Table 1 below.

Each Sample was exposed to UV radiation for discrete periods of time up to 2000 hours. After each exposure period a test piece was removed from the panel, washed to remove the protective and photocatalytic layers, and the surface gloss of the underlying paint was measured using a BYK GARDNER® Trigloss glossmeter. The results are presented in Table 2.

TABLE 1

Coating Compositions

| Sample No. | Paint system | Protective Coating | Surfactant | Photocatalyst Treatment |
|---|---|---|---|---|
| 1 | MF Polyester | None | None | None |
| 2 | MF Polyester | None | None | 2% P25 in water, 270 nm |
| 3 | MF Polyester | Ludox ® HS 30, 270 nm | None | 2% P25 in water, 270 nm |
| 4 | MF Polyester | Ludox ® HS 30, 270 nm | Triton X100, 0.2% v/v | 2% P25 in water, 270 nm |
| 5 | MF Polyester | Ludox ® HS 30, 270 nm | 2-[methoxy(oligoethyleneoxy)propyl]heptamethyltrisiloxane 0.4% v/v | 2% P25 in water, 270 nm |

TABLE 2

Surface Gloss Measurement

| Sample No. | Exposure Time (light hrs QUVA) | | | | | | | |
|---|---|---|---|---|---|---|---|---|
| | 112 | 224 | 336 | 448 | 560 | 672 | 784 | 2000 |
| 1 | ○ | ○ | ○ | ○ | ○ | ○ | ○ | ● |
| 2 | ● | ● | ● | ● | ● | ● | ● | ● |
| 3 | ● | ● | ● | ● | ● | ● | ● | ● |
| 4 | ○ | ■ | ■ | ■ | ■ | ● | ● | ● |
| 5 | ○ | ○ | ○ | ○ | ○ | ○ | ■ | ● |

○ - full retention of surface gloss
■ - partial retention of surface gloss
● - complete loss of surface gloss Sample 1 did not include a photocatalytic layer nor a protective layer and therefore did not exhibit self cleaning behaviour. Samples 2 to 5 each included a photocatalytic coating formed from a 2% w/w solution of P25 titanium dioxide photocatalyst in water. Sample 2 did not include a protective (barrier) coating between the paint layer and photocatalyst layer. Sample 3 did include a protective layer which comprised colloidal particles, but no surfactant. Sample 4 includes a protective layer including colloidal particles and a surfactant comprising TRITON® X-100 ($C_{14}H_{22}O(C_2H_4O)_n$). Sample 5 included a protective layer including colloidal particles and a surfactant incorporating an organosilicon component.

It is evident from a comparison of Sample 1 (no photocatalytic layer nor protective layer) with Sample 5 (including a photocatalytic layer and a protective layer comprising colloidal particles distributed in a matrix of a surfactant incorporating an organosilicon component) that similar gloss levels are retained at least up to an exposure time of 784 hours. This indicates that the protective layer prevents degradation of the paint layer by radicals generated by the photocatalytic layer.

A comparison of the gloss level results for those samples that did include a photocatalytic layer (ie, Samples 2 to 5) shows that optimum results were achieved when a protective layer was included, and where that protective layer contained a surfactant incorporating an organosilicon component. Where the surfactant did not include an organosilicon component (such as in Sample 4) gloss levels were only partially retained. In contrast, in Sample 5, where the surfactant comprised 2-[methoxy(oligoethyleneoxy)propyl] heptamethyltrisiloxane, there was full retention of surface gloss until in excess of 700 hours exposure time.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A photocatalytic, self-cleaning, coated building product including:
   a metal substrate including a treated layer comprising a painted layer,
   a photocatalytic layer, and
   a non-photocatalytic protective layer for impeding photocatalyst derived degradation of the treated layer, the protective layer being provided between the photocatalytic layer and the treated layer, the protective layer consisting of: (a) discrete spherical colloidal particles and (b) a matrix;
   wherein the particles have a narrow particle size distribution comprising a standard deviation of less than 20% of the average particle diameter, wherein the particles are in a lattice formation and are distributed in the matrix, which is comprised of:
   (i) an organosilicon phase which is oxidisable by reactive oxygen species to form a non-volatile inorganic phase, and/or
   (ii) one or more inorganic silicates formed by the oxidation of at least one organosilicon phase by reactive oxygen species,
   wherein the organosilicon phase comprises a surfactant incorporating an organosilicon component.

2. The coated building product according to claim 1, wherein the organosilicon phase is oxidisable by the reactive oxygen species to form a network silicate.

3. The coated building product of claim 1, wherein the silica colloid particles include a coating of an organosilicon compound.

4. The coated building product of claim 1, wherein the surfactant incorporating an organosilicon component is selected from the family of ethoxylated heptamethyltrisiloxane surfactants or polyalkyleneoxide modified heptamethyltrisiloxanes.

5. The coated building product of claim 1, wherein the colloidal particles are selected from one or more oxides of metallic and/or non-metallic elements selected from silicon, aluminium, boron, titanium, zirconium and phosphorous.

6. The coated building product of claim 1, wherein the colloidal particles comprise nanoparticulate silica colloids.

7. The coated building product of claim 1, wherein the colloidal particles have a particle size in the range from 0.4 to 400 nm.

8. The coated building product of claim 1, wherein the colloidal particles are composed of at least two materials with different particle size distributions.

9. The coating building product of claim 1, wherein a gloss difference, measured at a 60° angle of incidence according to ASTM D523, between the coated substrate and an uncoated substrate is not more than 20%.

10. The coated building product of claim 1, wherein the protective layer has a thickness of from 25 to 1000 nm.

11. A photocatalytic, self-cleaning coated building product comprising:
    a metal substrate including a treated surface comprising a painted layer;
    a non-photocatalytic barrier layer on the treated surface, the barrier layer comprising discrete spherical colloidal particles having a narrow particle size distribution comprising a standard deviation of less than 20% of the average particle diameter in a lattice-like formation and distributed in a matrix comprised of one or more organosilicon phases which are oxidisable by reactive oxygen species to form one or more inorganic silicate phases, and/or one or more inorganic silicates formed by the oxidation of at least one organosilicon phase by reactive oxygen species,
    wherein said one or more organosilicon phase is a surfactant incorporating an organosilicon component; and
    a photocatalytic layer on the barrier layer,
    wherein the barrier layer does not include elongate particles.

12. A method for protecting a metal substrate from degradation by reactive oxygen species, the method including the steps of:

providing a metal substrate including an treated layer comprising a painted layer;

applying on the treated layer a coating of a composition consisting of: (a) discrete spherical colloidal particles and (b) a medium;
   wherein the particles have a narrow particle size distribution comprising a standard deviation of less than 20% of the average particle diameter, wherein the particles are dispersed in the medium comprising at least one organosilicon phase which is oxidisable by reactive oxygen species to form an inorganic silicate phase, the at least one organosilicon phase comprising a surfactant incorporating an organosilicon component;

converting the coating to form a protective layer.

13. The coated building product of claim 1, wherein the surfactant incorporating an organosilicon component is 2-[methoxy(polyethyleneoxy)-propyl]heptamethyltrisiloxane.

14. A method for protecting a metal substrate from degradation by reactive oxygen species, the method including the steps of:

providing a metal substrate including an treated layer comprising a painted layer;

applying on the treated layer a coating of a composition comprising discrete spherical colloidal particles, wherein the particles have a narrow particle size distribution comprising a standard deviation of less than 20% of the average particle diameter, wherein the particles are dispersed in a medium comprising at least one organosilicon phase which is oxidisable by reactive oxygen species to form an inorganic silicate phase, the at least one organosilicon phase comprising a surfactant incorporating an organosilicon component, wherein the coating does not include elongate particles;

converting the coating to form a protective layer.

* * * * *